Nov. 29, 1960 V. RUSCIANO 2,962,155
SECTIONAL CASING FOR HYPODERMIC NEEDLES AND THE LIKE
Filed Oct. 16, 1958
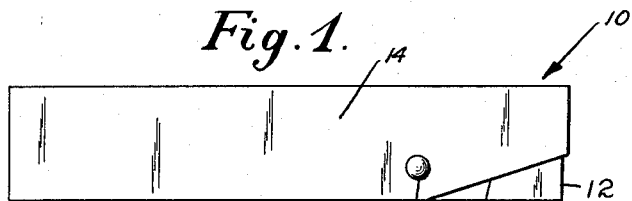
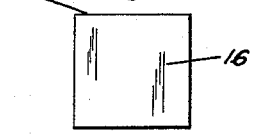
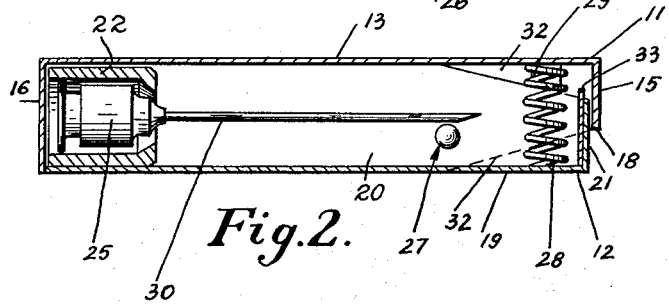
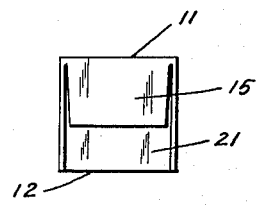
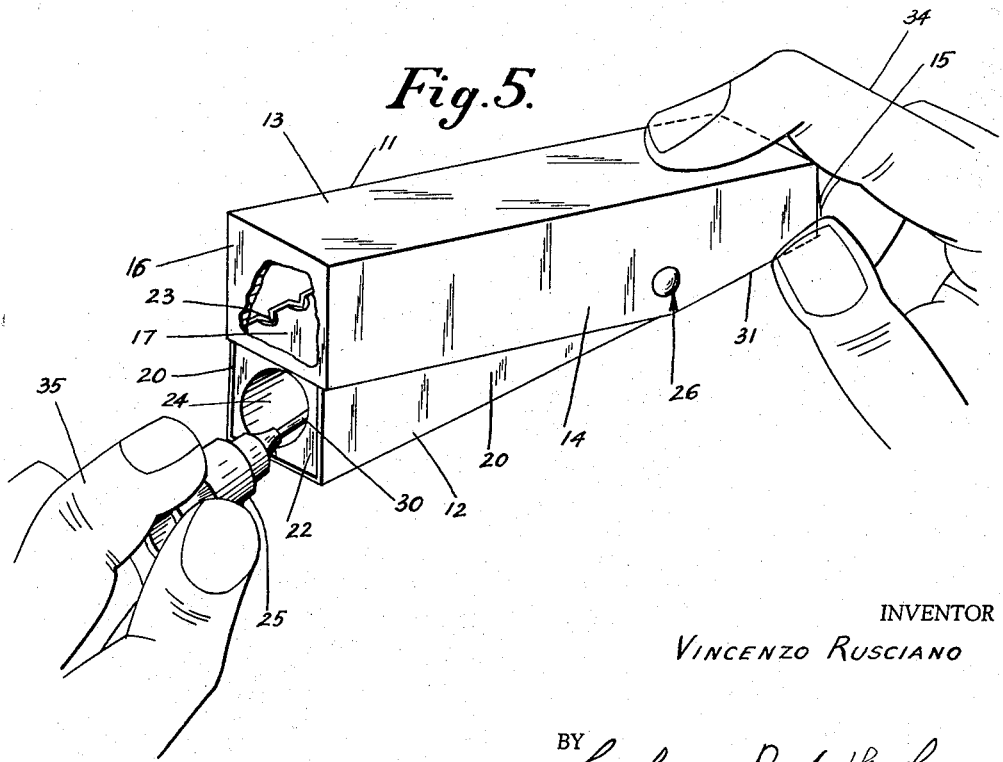
INVENTOR
VINCENZO RUSCIANO
BY
ATTORNEYS United States Patent Office 2,962,155
Patented Nov. 29, 1960

2,962,155
SECTIONAL CASING FOR HYPODERMIC NEEDLES AND THE LIKE

Vincenzo Rusciano, Taranto, Italy, assignor to Eisele & Company, Nashville, Tenn., a corporation of Tennessee Filed Oct. 16, 1958, Ser. No. 767,564

1 Claim. (Cl. 206—17.5)

The present invention relates to holders for articles and more particularly to a sectional casing having interfitting members arranged to provide a housing for a hypodermic needle or the like.

An important object is to provide a simple, efficient, sanitary, compact and economical casing having interfitting sections or members, one of which sections constitutes an inner member having an open top, and closed confronting sides. One end of the inner member is closed and its opposite end is opened so as to receive a tubular block into which is inserted any suitable article such as a hypodermic needle or the like so as to support the same within the casing, when the parts are moved to their closed position. The other section of the casing provides an outer member having a closed top and also closed sides and ends but with the bottom opened and of substantially the same size and shape as the inner member so as to overlap the sides and the ends of the inner member to completely cover the same when the parts are in their closed position. Expansion spring means extends transversely within the casing adjacent the end remote from the tubular block so as normally to urge the closed end of the outer member to overlap the open end of the inner member and the block therein, so as to provide means for holding and maintaining a hypodermic needle or the like within the casing and for conveniently opening one end of the inner member so as readily to obtain access for removing the hypodermic needle or for storing the same within the housing.

A further object consists in connecting the sections of the housing so that when the parts are in their closed position, means are provided for permitting the entry of vapor into the casing so that a hypodermic needle therein may be sterilized and also be readily accessible so as to be withdrawn in a simple and efficient manner when it is desired to use the same.

Other objects of the invention will become apparent when taken in conjunction with the accompanying claims and drawing.

Referring to the drawing:

Fig. 1 is a side elevational view of a needle casing constructed in accordance with the present invention;

Fig. 2 is a longitudinal sectional view of Fig. 1 showing a hypodermic needle in its stored position;

Fig. 3 is a left-hand end view of Fig. 1;

Fig. 4 is a right-hand view of Fig. 1, and

Fig. 5 is a detailed perspective view showing the sectional casing in its open position and the position of the parts when a hypodermic needle or the like is being inserted or removed from the casing.

Referring to the drawings, 10 generally indicates a casing or holder for an article, such as a hypodermic needle or the like. The casing 10 is of sectional form and includes an outer member 11 and an inner interfitting member 12 which may be of any desired length, size and shape. As shown, the outer member 11 has a closed top 13, depending confronting sides 14 as well as ends 15 and 16, and an open bottom 17. The end 15 may be separated from the sides 14 by a slit 18 so as to provide a depending yieldable portion.

The inner member 12 has a closed bottom 19 and upwardly extending confronting sides 20 and a closed end 21 (Fig. 2). The opposite end of the inner member 12 is open so as to receive a tubular supporting block or sleeve 22 fixedly secured to the inner member, as at 23 (Fig. 5), and which is provided with an axial or central through opening 24 for receiving the hub or head 25 of a hypodermic needle 30 or the like when the parts are in their open position.

The sides 14 of the outer member 11 adjacent the yieldable end 15 is provided with transversely aligned indentations 26 arranged to register and be pivotally connected to complementary formed recesses 27 (Fig. 2) formed on the adjacent sides 20 of the inner member so as to provide means for pivotally connecting the inner member 12 to the outer member 11. In order to normally urge the end 16 of the outer member 11 inwardly relative to the opening 24 in the block 22 so as to close this opening, a coil expansion spring 28 is positioned transversely within the casing between the pivotal connection 27 and the flexible end 15, and may be maintained in a fixed position by a depending lug 29 which extends downwardly from the inner side of the outer member 11 (Fig. 2). Thus, it will be seen that the expansion pressure exerted by the spring 28 against the adjacent ends of the members 12 and 11 will cause the opposite ends of these members to be moved towards each other to their closed position so as to store a needle or the like positioned within the casing and carried by the tubular member 22. The needle 30 when the latter is inserted within the casing, extends towards the opposite end thereof but is free from contact with any of the parts. The casing is so designed as to permit the entry of vapor therein in order that the needle 30 may be sterilized while in the casing.

To facilitate the convenient manual handling of the sectional casing 10, the confronting sides 14 of the outer member 11 between the pivot 26 and the yieldable end 15 have their lower edges 31 inclined upwardly and outwardly towards the end 15. Similarly, the sides 20 of the inner member between the pivot 27 and the end thereof adjacent to the spring 28, are provided with complementary inclined edges 32 so as to co-act with the confronting edges 31 to provide means for facilitating the movement of the opposite ends of the members 11 and 12 to either their opened or closed positions. A strap 33 (Fig. 2) may be welded or otherwise secured to the inner side of the flange 21 of the inner member so as to project slightly above the tapered or cutout portion 32 thereof in order to provide stop means for limiting the outward movement of the member 11 relative to the member 12. The yieldable end 15 of the outer member is separated from the adjacent sides thereof so as to provide a clearance for permitting the entry of vapor into the casing to insure proper sterilization of the needle therein. Additionally, the yieldable end 15 provides means for facilitating the removal of the inner member from the outer member upon displacement of the latter about its pivot until it is released therefrom.

In operation, assuming that a sterilized hypodermic needle such as 30 has been inserted into the casing through the opening 24 in the tubular member 22, so as to be positioned as shown in Fig. 2 of the drawing, the outward expansion of the spring 28 will cause the end 15 of the outer member to be moved so as to overlap and close the opening 24 in the tubular member and the hypodermic needle, thus providing means for safely maintaining the needle in a fixed position and at the same time allowing convenient handling and storage of the needle until its use is required. Upon the application of inward pressure exerted by the fingers of the right hand 34 of the operator on the top 13 and the bottom 19 of the inner member, the opposite ends of these members will be moved from their closed position, as shown in Fig. 2, to their open position, as shown in Fig. 5, so as to permit the convenient insertion of the needle 30 by the left hand 35 of the operator or withdrawal of the needle from the casing.

While the invention is shown primarily for the purpose of housing and storing a hypodermic needle in a sanitary condition within a casing or holder, it will be manifest that the sectional casing may be used with equal efficiency as a holder for tooth brushes, pills, fountain pens and the like, if so desired. The casing 10 may be made of any light durable metal, plastic or the like and completely houses the needle so that it is readily accessible at a minimum expenditure of time and effort.

It will be understood that the form of the invention is merely illustrative and that such changes as may be made come within the scope of the following claim.

I claim:

A case for storing a hypodermic needle in a manner whereby it is protected from contamination comprising: an elongated inner member having a bottom, confronting side walls, an open top, and an end wall at a first end thereof; and elongated outer member having a top, confronting side walls, an open bottom, an end wall at a first end thereof and an end wall at a second end thereof; said inner member being normally disposed within said outer member with its open top facing the inner surface of the top of said outer member, said members being so proportioned that said inner member will fit within said outer member to form an elongated closure with the end wall at the second end of said outer member closing the open corresponding end of said inner member; said members being pivotally engaged one to the other to swing to a position where the open end of said inner member is free of being closed by the end wall at the second end of said outer member; a block disposed within the open end of said inner member, said block having a clearway therethrough, the size of the portion of the clearway nearest the second end of said inner member being of sufficient size to accept the hub of a hypodermic needle and the remainder of said clearway being of a size to allow the stem of a hypodermic needle to pass therethrough but to reject passage of the hub of the needle; spring means disposed within said inner member to bear against the inner surface of the bottom thereof and to bear against the inner surface of the top of said outer member, said spring means being located between the pivotal engagement of said members and the first ends of said members to resiliently urge said members to relative positions wherein the end wall at the second end of said outer member closes the open end of said inner member; stop means disposed at the first end of said inner member, said stop means extending toward the inner surface of the top of said outer member, the arrangement being such that said stop means will contact and retard the opening movement of said outer member when the second end of said outer member is free of a closing relationship with the clearway of the block at the second end of said inner member; the relationship of respective end walls at the second end of said case being such that there is an opening therebetween when the case is closed to allow access to sterilizing vapors, said opening being arranged so as to prevent contact between a sterilized needle disposed within said case and a contaminated object extending through the opening, the end wall of said inner member having a height which is less than the greatest height of the side walls of said inner member; the portions of the side walls of said inner member located between the pivotal engagement of the respective members and the end wall of said inner member having a height less than the greatest height of the side walls of said inner member.

References Cited in the file of this patent

UNITED STATES PATENTS

| | | |
|---|---|---|
| 921,149 | Norwood | May 11, 1909 |
| 1,203,787 | Rietveld | Nov. 7, 1916 |
| 2,079,002 | De Loeschnigg | May 4, 1937 |
| 2,556,817 | McKenzie | June 12, 1951 |
| 2,557,222 | Goode | June 19, 1951 |